(12) United States Patent
Hakiri et al.

(10) Patent No.: US 8,197,049 B2
(45) Date of Patent: Jun. 12, 2012

(54) INKJET RECORDING INK, INK CARTRIDGE, INKJET RECORDING METHOD, INKJET RECORDING APPARATUS, AND INK RECORDED MATTER

(75) Inventors: Minoru Hakiri, Shizuoka (JP); Mitsuru Naruse, Shizuoka (JP); Hiroyuki Fushimi, Shizuoka (JP); Shin Hasegawa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 164 days.

(21) Appl. No.: 12/809,783

(22) PCT Filed: Dec. 18, 2008

(86) PCT No.: PCT/JP2008/073670
§ 371 (c)(1),
(2), (4) Date: Jun. 21, 2010

(87) PCT Pub. No.: WO2009/081998
PCT Pub. Date: Jul. 2, 2009

(65) Prior Publication Data
US 2010/0277548 A1     Nov. 4, 2010

(30) Foreign Application Priority Data

Dec. 21, 2007  (JP) ................. 2007-330647

(51) Int. Cl.
*B41J 2/17* (2006.01)
(52) U.S. Cl. ............... 347/95; 347/100; 347/84
(58) Field of Classification Search ............... 347/84–87, 347/95, 100; 106/31.13, 31.27, 31.6; 523/160–161
See application file for complete search history.

(56) References Cited

U.S. PATENT DOCUMENTS

| 5,085,698 | A | 2/1992 | Ma et al. |
|---|---|---|---|
| 5,172,133 | A | 12/1992 | Suga et al. |
| 5,571,311 | A | 11/1996 | Belmont et al. |
| 6,547,381 | B2* | 4/2003 | Watanabe et al. ............ 347/100 |
| 6,786,959 | B2 | 9/2004 | Hakiri et al. |
| 7,101,919 | B2 | 9/2006 | Hasegawa et al. |
| 2006/0209149 | A1 | 9/2006 | Hasegawa et al. |
| 2006/0272543 | A1 | 12/2006 | Hakiri et al. |
| 2008/0036830 | A1 | 2/2008 | Natori et al. |
| 2008/0036840 | A1 | 2/2008 | Hakiri et al. |

FOREIGN PATENT DOCUMENTS

| JP | 56 147871 | 11/1981 |
|---|---|---|
| JP | 5 239392 | 9/1993 |
| JP | 8 3498 | 1/1996 |
| JP | 8 81646 | 3/1996 |
| JP | 8 283633 | 10/1996 |
| JP | 8 333531 | 12/1996 |
| JP | 9 194775 | 7/1997 |
| JP | 2000 63727 | 2/2000 |

(Continued)

*Primary Examiner* — Juanita D Jackson
(74) *Attorney, Agent, or Firm* — Oblon, Spivak, McClelland, Maier & Neustadt, L.L.P.

(57) ABSTRACT

The present invention provides an inkjet recording ink containing at least a pigment dispersion liquid A containing at least a first carbon black, a dispersant, and water, and a self-dispersible pigment dispersion liquid B which contains a second carbon black having a surface functional group, wherein a mass ratio (Ac:Bc) of the amount of the first carbon black (Ac) in the pigment dispersion liquid A to the amount of the second carbon black (Bc) having a surface functional group in the self-dispersible pigment dispersion liquid B is 98:2 to 50:50.

10 Claims, 1 Drawing Sheet

FOREIGN PATENT DOCUMENTS

| | | |
|---|---|---|
| JP | 2000 144028 | 5/2000 |
| JP | 2001 81366 | 3/2001 |
| JP | 2002 3767 | 1/2002 |
| JP | 2004 115550 | 4/2004 |
| JP | 3625595 | 3/2005 |
| JP | 2005 281691 | 10/2005 |
| JP | 2006 8858 | 1/2006 |
| JP | 2006 160819 | 6/2006 |
| JP | 2006 219584 | 8/2006 |
| JP | 2006 328422 | 12/2006 |
| JP | 2007 63493 | 3/2007 |
| JP | 2008 260920 | 10/2008 |

\* cited by examiner

INKJET RECORDING INK, INK CARTRIDGE, INKJET RECORDING METHOD, INKJET RECORDING APPARATUS, AND INK RECORDED MATTER

TECHNICAL FIELD

The present invention relates to an inkjet recording ink capable of providing high image density and excellent storage stability thereof and a pigment dispersion liquid therein and preventing the occurrence of clogging at inkjet heads, an ink cartridge, an inkjet recording method, an inkjet recording apparatus, and an ink recorded matter.

BACKGROUND ART

A method for inkjet recording has advantages in that it facilitates full-color printing because processes in the method for inkjet recording is simpler than processes in other methods for recording and it allows for obtaining high-resolution images even by a simply structured apparatus of the method for inkjet recording.

As an ink used in such a method for inkjet recording, a dye-based ink is typically used in which various water-soluble dyes are dissolved in water or a mixed liquid containing water and an organic solvent, however, dye-based inks have a disadvantage in that they are poor in light resistance, although they are excellent in color tone sharpness. On the other hand, a pigment-based ink in which a carbon black or various organic pigments are dispersed is actively studied because of its excellence in light resistance, as compared to dye-based inks.

However, the pigment-based inks tend to easily cause nozzle clogs as compared to dye-based inks.

The pigment-based ink is prepared by preparing a dispersion in which a coloring material and a dispersant are preliminarily dispersed in an aqueous solvent such as water and alcohols, dispersing the dispersion to a predetermined degree using a media type dispersing device such as sand mill, and then diluting the dispersion to a predetermined concentration.

Typically, in a water-based pigment ink, a surfactant or a water-soluble resin is used for dispersing a hydrophobic pigment, however, the reliability of quality of obtained images with the use of such a water based pigment ink is extremely poor. Then, aiming to improve the image quality, a technique is proposed in which film-formable fine resin particles are added in an ink liquid. However, it is difficult to finely and stably disperse a plurality of components in a liquid for a long period of time. When a large amount of a dispersant such as surfactant is used for stably dispersing these fine particles, air bubbles occur in an ink tank and an ink head, or image quality is degraded. For improving dispersibility of these components, considered are a method of changing the surfaces of a pigment to be hydrophilic, and a method of using a resin containing a hydrophilic group(s), and the like. However, these methods have a problem that when these methods are applied in combination, the dispersion becomes unstable and the storage stability is degraded, although when these methods are applied separately, each resultant dispersion is stable.

To solve the above described problems, proposed are a method of incorporating in an ink a water-insoluble coloring material for obtaining high image density and chargable resin pseudo fine particles having a size smaller than the coloring material (see Patent Literature 1); a method of incorporating in an ink a self-dispersible pigment in a limited absorption amount of DBP oil (see Patent Literature 2); and a method of using a water-based carbon black dispersion liquid with an HLB value of 7 to 18, in which a surface-modified carbon black and a nonionic surfactant having an acetylene skeleton are contained (see Patent Literature 3).

In addition, for the purpose of stabilizing the dispersion of these components in a water-based ink liquid, proposed are a method of dispersing in a water a water-dispersible resin having a carboxyl group and a nonionic hydrophilic group within a molecule (see Patent Literature 4), a method of conforming the polarity of a water-soluble polymer to that of a surfactant or adding a nonionic surfactant in a water-based liquid (see Patent Literature 5), a method of conforming the polarity of a colored ionic polyester resin to that of a hydrophilic group of a colorant in an aqueous recording liquid (see Patent Literature 6), and a method of conforming the dispersion polarity of a pigment to that of a resin fine particle (see Patent Literature 7).

Further, a water-based inkjet ink composition is proposed, which contains a pigment dispersion liquid containing pigment particles in which at least 70% of the particles in the dispersion liquid have diameters less than 0.1 μm and the other particles in the dispersion liquid have a particle size distribution with a diameter of 0.1 μm or less, an aldehyde naphthalenesulfonate dispersant, and/or at least one sulfone solvent (see Patent Literature 8). Patent Literature 9 proposes a recording liquid composed of a water-based medium which contains a pigment, a polymer dispersant and a nonionic surfactant. Furthermore, Patent Literature 10 proposes use of an AB block copolymer or a BAB block copolymer as a dispersant for pigments. Moreover, Patent Literature 11 proposes use of a specific pigment, water-soluble resin and solvent.

Meanwhile, as a method of dispersing a pigment without using a dispersant, proposed are, for example, a method of introducing substituents containing a solubilizing group(s) for water into a carbon black (see Patent Literature 12), a method of polymerizing a water-soluble monomer etc. to the surface of a carbon black (see Patent Literature 13), and a method of subjecting a carbon black to an oxidative treatment (see Patent Literature 14). A method is also proposed which ensures water resistance and ejection stability of an ink through the use of an ink containing a carbon black that has been subjected to an oxidative treatment, and a ternary copolymer composed of acrylic acid, styrene and a-methyl styrene (see Patent Literature 15).

Further, an inkjet recording liquid is proposed in which the volume average particle diameter of dispersion particles is 30 nm to 200 nm (see Patent Literature 16).

As for the above-mentioned inkjet recording liquids, color pigment inks actually allow for obtaining high image densities, however, black pigment inks have not yet been able to provide enough performance to satisfy users. In addition, a technique is proposed in which a bead of a bead size of about 0.05 mm to 1.0 mm is used in bead mill dispersion (see Patent Literature 17). However, this proposal has not been able to provide sufficient dispersion stability.

Further in Patent Literature 18, as a dispersant used is an anionic surfactant, which preferably has a molecular weight in the range of 1,000 to 30,000. However, this proposal does not provide sufficient dispersion stability, involves a type of pigment which is weak in resistance to impact caused by dispersion treatment and thus lacks stability after dispersion treatment, which leads to degradation of ejection stability of an ink.

Thus at present, an inkjet recording ink capable of providing high image density and excellent storage stability thereof and a pigment dispersion liquid therein and preventing the occurrence of clogging at inkjet heads, and its associated technology have not been provided yet.

[Patent. Literature 1] Japanese Patent Application Laid-Open (JP-A) No.2006-8858
[Patent Literature 2] JP-A No.2002-3767
[Patent Literature 3] JP-A No.2006-219584
[Patent Literature 4] JP-A No.05-239392
[Patent Literature 5] JP-A No.08-283633
[Patent Literature 6] JP-A No.2000-63727
[Patent Literature 7] JP-A No.2001-81366
[Patent Literature 8] JP-A No.08-333531
[Patent Literature 9] JP-A No.56-147871
[Patent Literature 10] U.S. Pat. No.5,085,698 [Patent Literature 11] U.S. Pat. No.5,172,133
[Patent Literature 12] U.S. Pat. No.5,571,311
[Patent Literature 13] JP-A No.08-81646
[Patent Literature 14] JP-A No.08-3498
[Patent Literature 15] JP-A No.09-194775
[Patent Literature 16] JP-A No.2000-144028
[Patent Literature 17] JP-A No.2005-281691
[Patent Literature 18] Japanese Patent (JP-B) No. 3625595

DISCLOSURE OF INVENTION

An object of the present invention is to provide an inkjet recording ink capable of providing high image density and excellent storage stability thereof and a pigment dispersion liquid therein and preventing the occurrence of clogging at inkjet heads, an ink cartridge, an inkjet recording method, an inkjet recording apparatus, and an ink recorded matter.

As a result of earnest studies aiming to solve the above mentioned problems, the present inventors found that the above mentioned problems could be efficiently solved by using an inkjet recording ink containing a pigment dispersion liquid A which contains at least a first carbon black, a dispersant, and water, and a self-dispersible pigment dispersion liquid B which contains a second carbon black having a functional group on a surface, wherein a mass ratio (Ac:Bc) of the amount of the first carbon black (Ac) in the pigment dispersion liquid A to the amount of the second carbon black (Bc) having a functional group on a surface in the self-dispersible pigment dispersion liquid B is adjusted so as to fall within the range of 98:2 to 50:50.

The present invention is based on the above findings by the inventors. The means for solving the problems are as follows:
<1> An inkjet recording ink containing at least a pigment dispersion liquid A which contains a first carbon black, a dispersant, and water, and a self-dispersible pigment dispersion liquid B which contains a second carbon black having a functional group on a surface, wherein a mass ratio (Ac:Bc) of the amount of the first carbon black (Ac) in the pigment dispersion liquid A to the amount of the second carbon black (Bc) in the self-dispersible pigment dispersion liquid B is 98:2 to 50:50.
<2> The inkjet recording ink according to the item <1>, wherein the dispersant in the pigment dispersion liquid A is a sodium naphthalene sulfonate formalin condensate, and the total amount of a dimer, a trimer and a tetramer of naphthalenesulfonic acid in the sodium naphthalene sulfonate formalin condensate is 20% by mass to 80% by mass.
<3> The inkjet recording ink according to any one of the items <1> and <2>, wherein the first carbon black in the pigment dispersion liquid A is a gas black, and has a BET specific surface area of 100 m$^2$/g to 400 m$^2$/g and an average primary particle diameter of 10 nm to 30 nm.
<4> The inkjet recording ink according to any one of the items <1> to <3>, wherein in the ink the first and second carbon blacks have a volume average particle diameter ($D_{50}$) of 70 nm to 180 nm as measured by a dynamic light scattering method, and a standard deviation of a particle size distribution of the first and second carbon blacks is one-half or less of the volume average particle diameter $D_{50}$.
<5> The inkjet recording ink according to any one of the items <1> to <4>, wherein the amount of the dispersant contained in the pigment dispersion liquid A is 0.1 parts by mass to 2 parts by mass relative to 1 part by mass of the first carbon black.
<6> The inkjet recording ink according to any one of the items <1> to <5>, wherein the total amount of the carbon blacks in the pigment dispersion liquid A and the self-dispersible pigment dispersion liquid B is 5% by mass to 50% by mass.
<7> The inkjet recording ink according to any one of the items <1> to <6>, wherein the amount of the carbon blacks in the ink 2 0 is 1% by mass to 20% by mass.
<8> An ink cartridge containing at least a container to house the inkjet recording ink according to any one of the items <1> to <7>.
<9> An inkjet recording apparatus containing at least an ink jetting unit configured to jet an inkjet recording ink by applying a stimulus to the inkjet recording ink according to any one of the items <1> to <7> to form an image.
<10> An inkjet recording method including at least jetting the inkjet recording ink according to any one of the items <1> to <7> by applying a stimulus to the ink to form an image.
<11> The inkjet recording method according to the item <10>, wherein the inkjet recording method is any one of a piezo-inkjet method and a thermal-inkjet method.
<12> An ink recorded matter containing at least an image formed on a recording medium with the use of the inkjet recording ink according to any one of the items <1> to <7>.
<13> The ink recorded matter according to the item <12>, wherein the recording medium is paper.

According to the present invention, the problems of the prior arts can be solved, and an inkjet recording ink, an ink cartridge, an inkjet recording method, an inkjet recording apparatus, and an ink recorded matter can be provided which can provide high image density and excellent storage stability, which can improve inkjet heads so as to avoid clogging, and which can provide excellent storage stability of a pigment dispersion liquid.

BEST MODE FOR CARRYING OUT THE INVENTION (Inkjet Recording Ink)

An inkjet recording ink according to the present invention contains a pigment dispersion liquid A which contains at least a carbon black, a dispersant, and water, and a self-dispersible pigment dispersion liquid B which contains a carbon black having a functional group on a surface, as well as a wetting agent, a penetrating agent, a surfactant and additional components as required.

In the inkjet recording ink, a mass ratio (Ac:Bc) of the amount of a carbon black in the pigment dispersion liquid A (Ac) to the amount of a carbon black having a functional group on a surface in the self-dispersible pigment dispersion liquid B (Bc) is 98:2 to 50:50, preferably is 95:5 to 60:40, and more preferably 85:15 to 65:35.

When the amount of the pigment dispersion liquid A in the ink is more than 98% by mass, the image density on regular paper decreases. When the amount is less than 50% by mass, the image density may sometimes decrease on a support with less ink penetration (processed paper) such as of high gloss paper, etc.

The amount of the carbon blacks in the pigment dispersion liquid A and the self-dispersible pigment dispersion liquid B can be calculated based on information of the blending formulation, or alternatively can be determined by using, for example, an infrared absorption spectrometry.

<Pigment Dispersion Liquid A>

The pigment dispersion liquid A contains at least a carbon black, a dispersant, and water, as well as further other components as required.

Examples of the carbon black include those manufactured by gas black method, furnace method, and channel method. Among these carbon blacks, the carbon black manufactured by gas black method is particularly preferred.

For the carbon black, commercially available products can be used: the examples of the commercially available product for the carbon black include #45L, MCF88, #990, MA600, and #850 (manufactured by Mitsubishi Chemical Corporation); NIPEX90, NIPEX150, NIPEX160, NIPEX170, NIPEX180, COLOR BLACK FW200, PRINTEX25, and SPECIAL BLACK250 (manufactured by Degussa Japan Co., Ltd.); and REGAL400R, REGAL600R, and MOGUL L (manufactured by Cabot Corporation).

The carbon black preferably has an average primary particle diameter of 10.0 nm to 30.0 nm and a BET specific surface area of 100 $m^2/g$ to 400 $m^2/g$, and more preferably has an average primary particle diameter of 15.0 nm to 20.0 nm and a BET specific surface area of 150 $m^2/g$ to 300 $m^2/g$.

The average primary particle diameter of the carbon black can be measured by photographing particles using, for example, an electron microscope and calculating, based on the particle diameter and particle number in photographed images. The BET specific surface area of the carbon black can be measured by a BET method using nitrogen adsorption.

The carbon black used in the pigment dispersion liquid A has a small average primary particle diameter, is highly-structured, and is weak in resistance to impact caused during a dispersing process such that when a bead having a size of more than 0.05 mm is used, the structure of the carbon black is broken by strong collision energy among bead particles, resulting in that the stability of the carbon black dispersion liquid thus obtained is impaired. Therefore, the diameter of the bead is preferably 0.05 mm or less.

—Dispersant—

The dispersant is not particularly limited and can be appropriately selected depending on the purpose; a sodium naphthalene sulfonate formalin condensate is preferably used for the dispersant.

The sodium naphthalene sulfonate formalin condensate is a condensate of sodium naphthalene sulfonate and formaldehyde and is not particularly limited as long as it is a compound composed of a repetition of the above condensate.

The total amount of a dimer, a trimer, and a tetramer of naphthalenesulfonic acid in the sodium sulfonate formalin condensate against the total amount of the sodium naphthalene sulfonate formalin condensates is preferably 20% by mass to 80% by mass, and more preferably 35% by mass to 65% by mass.

When the total amount is less than 20% by mass, the dispersibility of the sodium naphthalene sulfonate formalin condensate and the storage stability of the pigment dispersion liquid and the ink are degraded, sometimes resulting in easy occurrence of nozzle clogging. When the total amount is more than 80% by mass, the viscosity of the pigment dispersion liquid A increases, sometimes resulting in difficult dispersion.

The amount of the dispersant added per 1 part by mass of the carbon black is preferably 0.1 parts by mass to 2 parts by mass, and more preferably 0.25 parts by mass to 1 part by mass. By adding the dispersant at such mixture ratio, an ink exhibiting high image density, excellent ejection stability, and excellent liquid stability can be provided.

When the amount added is less than 0.1 parts by mass, storage stability of the water-based pigment dispersion liquid and the ink is degraded, while the effects of the present invention become difficult to achieve, resulting in that nozzle clogging tends to occur easily. When the amount added is more than 2 parts by mass, it tends to be difficult to perform recording by an inkjet method because of the high viscosity of the water-based pigment dispersion liquid and the ink.

In addition to the carbon black, the dispersant, and water, further various additives such as water soluble organic solvent, nonionic surfactant, anionic surfactant, cationic surfactant, ampholytic surfactant, and antiseptic agent can be added as required to the pigment dispersion liquid.

The water soluble organic solvent is not particularly limited and can be appropriately selected depending on the purpose; examples thereof include alcohols such as methanol, ethanol, 1-propanol, and 2-propanol; polyvalent alcohols such as ethylene glycol, diethylene glycol, triethylene glycol, propylene glycol, and glycerine; pyrrolidone derivatives such as N-methyl pyrrolidone and 2-pyrrolidone; ketones such as acetone and methylethylketone; alkanolamines such as monoethanol amine, diethanol amine, and triethanol amine; various surfactants such as a nonionic surfactant, an anionic surfactant, a cationic surfactant, and an ampholytic surfactant; and antiseptic agents.

In order to obtain the carbon black dispersion liquid, the carbon black, the dispersant, water, and various additives as required are firstly dispersed by a bead mill such as DYNO-MILL TYPE KDL (manufactured by SHINMARU ENTERPRISES CORPORATION), AGITATOR Mill LMZ (manufactured by Ashizawa Finetech Ltd.), and SC MILL (manufactured by Mitsui Mining CO., LTD). After the first dispersion process using a bead mill, the resultant dispersion is further dispersed by a beadless mill, for example, a high-speed shearing force type mill such as CLEARSS5 (manufactured by Mtechnique K.K.), CAVITRON CD1010 (manufactured by Eurotec, Ltd.), and MODULE DR2000 (manufactured by SHINMARU ENTERPRISES CORPORATION); a thin-film spin system mill such as T.K.FILMICS (manufactured by PRIMIX Corporation); and a super high-pressure collision type mill such as ULTIMIZER (manufactured by SUGINO MACHINE LIMITED) and NANO-MIZER (manufactured by YOSHIDA KIKAI Co., LTD.).

Generally a ceramic bead is preferably employed for the bead used in the bead mill, and typically zirconia ball is employed. The bead preferably has a diameter of 0.05 mm or less, and more preferably a diameter of 0.03 mm or less.

In the process prior to the dispersion treatment using the dispersing device, pretreatment of coarse particles by a homogenizer, etc. makes it possible to obtain a sharper particle size distribution, which leads to improvement of image density and ejection stability, etc.

<Self-Dispersible Pigment Dispersion Liquid B>

The carbon black used in the self-dispersible pigment dispersion liquid B containing a functional group on a surface is a carbon black which is subjected to such a surface treatment that at least one selected from carboxyl group, carbonyl group, hydroxyl group, sulfo group, phosphate group, quaternary ammonium, and salts thereof is bonded to the surface, thereby the carbon black is made capable of being dispersed and/or dissolved in water without an aid of dispersant. Specifically the carbon black used in the self-dispersible pigment dispersion liquid B is obtained by physical treatment such as vacuum plasma treatment; a process of chemically bonding a functional group such as carboxyl group, hydroxyl group, or sulfo group to the surface of one carbon black particle using a diazoalkyl compound (N=N—R—X) according to M.L. Studebaker; a process of chemically bonding a phenol compound to the surface of one particle of a carbon-based material, especially a carbon black by radical reaction; or a process of grafting a functional group or a molecule containing a functional group to the surface of a carbon black particle. Unlike conventional surface oxidation processes, in the present invention a required functional group can be chemically bonded, in a necessary amount, to the surfaces of carbon black particles. In the present invention, a single type of functional group or multiple types of functional group may be grafted to one carbon black particle. The types of functional groups to be grafted and the degree to which functional groups are grafted may be appropriately determined in view of the dispersion stability, the color density, and the drying property of the ink at a surface of an inkjet head.

In the carbon black used in the self-dispersible pigment dispersion liquid B, the state in which a carbon black is stably existing throughout water without an aid of a dispersant is, herein, referred to as "dispersed and/or dissolved". It is often difficult to differentiate clearly the state of a substance being dissolved from the state of the substance being dispersed. In the present invention, such a pigment that is capable of stably existing throughout water without an aid of a dispersant can be used, irrespective of being dispersed or dissolved. Therefore, herein, a pigment capable of stably existing throughout water without an aid of a dispersant is sometimes called a water-soluble pigment, however, the term "water-soluble pigment" does not exclude a pigment being dispersed in water.

The carbon black used in the self-dispersible pigment dispersion liquid B is not particularly limited and can be appropriately selected depending on the purpose; examples thereof include carbon blacks manufactured by known methods such as a contact method, a furnace method, and a thermal method.

The type of the carbon black is not particularly limited and can be appropriately selected depending on the purpose; examples thereof include an acid carbon black, a neutral carbon black, and an alkaline carbon black.

Examples of the carbon black used in the self-dispersible pigment dispersion liquid B include a furnace black, a lamp black, an acetylene black, and a channel black.

For the carbon black, carbon blacks appropriately synthesized or commercially available carbon blacks may be used. Examples of the commercially available product include #10B, #20B, #30, #33, #40, #44, #45, #45L, #50, #55, #95, #260, #900, #1000, #2200B, #2300, #2350, #2400B, #2650, #2700, #4000B, CF9, MA8, MA11, MA77, MA100, MA220, MA230, MA600, and MCF88 (manufactured by Mitsubishi Chemical Corporation); MONARCH 120, MONARCH 700, MONARCH 800, MONARCH 880, MONARCH 1000, MONARCH 1100, MONARCH 1300, MONARCH 1400, MOGUL L, REGAL 99R, REGAL 250R, REGAL 3.00R, REGAL 330R, REGAL 400R, REGAL 500R, and REGAL 660R (manufactured by Cabot Corporation); PRINTEX A, PRINTEX G, PRINTEX U, PRINTEX V, PRINTEX 55, PRINTEX 140U, PRINTEX 140V, SPECIAL BLACK 4, SPECIAL BLACK 4A, SPECIAL BLACK 5, SPECIAL BLACK 6, SPECIAL BLACK 100, SPECIAL BLACK 250, COLOUR BLACK FW1, COLOUR BLACK FW2, COLOUR BLACK FW2V, COLOUR BLACK FW18, COLOUR BLACK FW200, COLOUR BLACK S150, COLOUR BLACK S160, and COLOUR BLACK S170 (manufactured by Degussa Japan Co., Ltd.).

The total amount of carbon blacks in the pigment dispersion liquid A and the self-dispersible pigment dispersion liquid B is preferably 5% by mass to 50% by mass, and more preferably 10% by mass to 40% by mass. When the total amount of the carbon blacks is less than 5% by mass, the productivity may sometimes be degraded. When the total amount of the carbon blacks is more than 50% by mass, the viscosity of the pigment dispersion liquid becomes so high that it becomes difficult to disperse the carbon blacks.

In an ink the carbon black preferably has a volume average particle diameter ($D_{50}$) of 70 nm to 180 nm measured according to a dynamic light scattering method, and the standard deviation of the particle diameters of the carbon black in a particle size distribution is preferably half the volume average particle diameter $D_{50}$ or less. Setting the volume average particle diameter and the standard deviation of the particle diameter of the carbon black in these ranges results in production of an ink which provides high image density and excellent ejection stability and storage stability.

Here, the volume average particle diameter of the carbon black is determined, for example, using a particle size distribution measuring device (UPA, manufactured by NIKKISO CO., LTD.) under the condition of 23° C. and 55% RH. The average particle diameter ($D_{50}$) of the carbon black means a particle diameter based on a volume distribution.

The amount of the carbon black in the ink is preferably 1% by mass to 20% by mass, and more preferably 3% by mass to 15% by mass. When the amount of the carbon black is less than 1% by mass, sharpness of a printed image is sometimes degraded because of low image density. When the amount of the carbon black is more than 20% by mass, not only the viscosity of the ink tends to be high, but also a nozzle sometimes becomes easy to clog.

—Wetting Agent—

The boiling point of the wetting agent is preferably 180° C. or more. When such a wetting agent is contained in the water-based pigment ink, water-retention and wettability of the ink composition can be ensured. Consequently, it is possible to obtain a water-based pigment inkjet ink that will not cause aggregation of coloring materials and increases in viscosity even when it is stored over a long period of time and to achieve excellent storage stability. Furthermore use of this water-based pigment ink can provide an inkjet ink capable of keeping, over a long period of time, the flowability of dry substances of the inkjet ink which are produced by leaving a small portion of the inkjet ink in an open space such as at a nozzle point of an inkjet printer. Moreover, it is possible to obtain high ejection stability without substantially causing nozzle clogging during recording or during rebooting process of the printer after recording discontinuation.

The wetting agent is not particularly limited and can be appropriately selected depending on the purpose; examples thereof include polyvalent alcohols such as ethylene glycol, diethylene glycol, 1-3-butyl glycol, triethylene glycol, polyethylene glycol, polypropylene glycol, 1,5-pentanediol, 1,6-hexanediol, glycerin, 1,2,6-hexanetriol, 2-ethyl-1,3-hexanediol, ethyl-1,2,4-butanetriol, 1,2,3-butanetriol, and petriol; polyvalent alcohol alkyl ethers such as ethyleneglycolmonoethylether, ethyleneglycolmonobutylether, diethyleneglycolmonomethylether, diethyleneglycolmonoethylether, diethyleneglycolmonobuthylether, tetraethyleneglycolmonomethylether, and propyleneglycolmonoethylether; polyvalent alcohol aryl ethers such as ethyleneglycolmonophenylether, and ethyleneglycolmonobenzilether; nitrogen-containing heterocyclic compounds such as 2-pyrolidone, N-methyl-2-pyrolidone, N-hydroxyethyl-2-pyrolidone, 1,3-dimethylimidazolidinone, ε-caprolactam, and γ-butyrolactone; amides such as formamide, N-methylformamide, and N,N-imethylformamide; amines such as monoethanolamine, diethanolamine, triethanolamine, monoethylamine, diethylamine, and triethylamine; sulfur-containing compounds such as dimethysulfoxide, sulfolane, and thio-diethanol; propylene carbonate, and ethylene carbonate. These wetting agents may be used alone or in combination of two or more. Of these wetting agents, 1,3-butylglycol, diethyleneglycol, triethyleneglycol, and glycerin are particularly preferred in terms of preventing clogging due to ink drying (i.e. defects in injection property due to water evaporation) and providing excellent effects in improving color saturation of images.

A ratio of the amount of the wetting agent against the total amount of the ink is preferably 50% by mass or less, and more preferably 5% by mass to 40% by mass.

—Penetrating Agent—

The penetrating agent is not particularly limited and can be appropriately selected depending on the purpose; examples thereof include nonionic surfactants such as polyoxyethylene alkyl ethers, polyoxyethylene alkyl phenyl ethers, polyoxyethylene glycol esters, polyoxyethylene polyoxypropylene decyl ethers, acetylene surfactants, silicone surfactants, and fluorine surfactants.

—Surfactant—

In an ink according to the present invention, a surfactant may be added at such an amount that it does not affect its ink properties. Examples of the surfactant include nonionic surfactants, anionic surfactants, cationic surfactants, and ampholytic surfactants. Specific examples of nonionic surfactants include those of BT Series (manufactured by Nikko Chemicals Co., Ltd.); those of NONIPOL Series (manufactured by Sanyo Chemical Industries, Ltd.); those of D-Series and O-Series (manufactured by Takemoto Oil & Fat Co., Ltd.); those of SURFINOL Series (manufactured by Air Products & Chemicals Inc.); those of OLFIN Series (manufactured by Nisshin Chemicals. Co., Ltd.); those of EMALEX DAPE Series (manufactured by NIHON EMULSION Co., Ltd.); silicone surfactants (manufactured by DOW CORNING TORAY SILICONE CO., LTD.); and fluorine surfactants (manufactured by Neos Co., Sumitomo 3M Ltd., Du Pont Kabushiki Kaisha, and Daikin Industries, Ltd., respectively).

Examples of the additional components include defoaming agent, antiseptic antifungal agent, anticorrosive, pH adjuster, specific resistance modifier, antioxidant, ultraviolet absorbing agent, oxygen absorbent, photostabilizing agent, and viscosity modifier.

A method for producing the inkjet recording ink according to the present invention is not particularly limited and can be a known method such as a method of stirring and mixing the pigment dispersion liquids, water, a wetting agent, a penetrating agent, a surfactant, etc., removing coarse particles and foreign matter (i.e. dust and dirt), etc. from the resulting mixture by vacuum filtration using a metal filter or a membrane filter, pressure filtration, or centrifugal filtration by a centrifuge, and then deaerating the resulting filtrate as required.

The inkjet recording ink according to the present invention can be preferably used in an ink cartridge for housing the ink as described below. In addition, the inkjet recording ink according to the present invention can be used for image formation by applying the inkjet recording ink to an inkjet recording apparatus which ejects the inkjet recording ink onto a recording medium such as paper, as described below.

(Ink Cartridge)

An ink cartridge according to the present invention includes a container to house the inkjet recording ink of the present invention.

The container is not particularly limited and the shape, the structure, the size, the material, or the like of the container can be appropriately selected depending on the purpose; preferred examples of the container include containers having at least an ink bag which is formed with aluminum laminate film, resin film, or the like, and a plastic case.

The ink cartridge of the present invention houses the inkjet recording ink of the present invention and can be detachably mounted on various inkjet recording apparatuses. Further, it is particularly preferable that the inkjet cartridge be detachably mounted to an inkjet recording apparatus of the present invention described below.

(Inkjet Recording Apparatus and Inkjet Recording Method)

The inkjet recording apparatus of the present invention is composed of at least an ink jetting unit configured to jet the inkjet recording ink according to the present invention by applying a stimulus to the inkjet recording ink, to form an image, and is further composed of additional units as required.

An inkjet recording method of the present invention includes at least an ink jetting step in which the inkjet recording ink according to the present invention is jetted by applying a stimulus to the inkjet recording ink to form an image, and further includes additional steps as required.

Examples of the ink jetting unit include continuous injection type ink jetting units and on-demand type ink jetting units. Examples of the on-demand type ink jetting unit include ink jetting units using piezo-inkjet method, thermal-inkjet method, and electrostatic-inkjet method. Among these ink jetting units, those using a piezo-inkjet method and a thermal-inkjet method are particularly preferred.

The piezo-inkjet method is a method in which a diaphragm forming a wall surface of an ink flow passage is deformed by means of a piezoelectric element as a pressure generating unit configured to pressurize an ink flowing in the ink flow passage and change the ink volume in the ink flow passage, thereby ink droplets can be jetted (see Japanese Patent Application Laid-Open (JP-A) No.02-51734).

The thermal-inkjet method is a method in which an ink is heated in an ink flow passage using a heat element or a resistive element to generate air bubbles therein, thereby ink droplets can be jetted (see Japanese Patent Application Laid-Open (JP-A) No. 61-59911).

The electrostatic-inkjet method is a method in which a diaphragm forming a wall surface of an ink flow passage is deformed by applying a static electricity generated in between the diaphragm and electrodes, where the diaphragm is disposed to face the electrodes, to change the ink volume in the ink flow passage, thereby ink droplets can be jetted (see Japanese Patent Application Laid Open (JP-A) No. 06-71882).

The stimulus can be generated, for example, by means of a stimulus generating unit. The stimulus is not particularly limited, may be appropriately selected depending on the purpose, and examples thereof include heat (temperature), pressure, vibration, and light. These stimuli may be used alone or in combination of two or more. Among these, heat and pressure are preferably used.

Examples of the stimulus generating unit include heaters, pressurizing devices, piezoelectric elements, vibration generators, ultra-sonic oscillators, and light. Specific examples of the stimulus generating unit include piezoelectric actuators such as piezoelectric elements; thermal actuators utilizing phase changes attributable to film boiling of a liquid by using an electric heat exchanger element such as exothermic resistor; shape-memorizing alloy actuators using metal phase changes attributable to temperature change; and electrostatic actuators using electrostatic force.

The aspect of the jetting of the inkjet recording ink is not particularly limited and differs depending on the type of the stimulus. For example, when the stimulus is heat, there is a method in which a heat energy in accordance with a recording signal is given to the inkjet recording ink in a recording head by using, for example, a thermal head to generate air bubbles in the inkjet recording ink by means of the effect of the heat energy and to thereby jet and spray the inkjet recording ink as droplets from a nozzle hole of the recording head by means of the effect of the pressure of the air bubbles. When the stimulus is pressure, for example, there is a method in which a voltage is applied to a piezoelectric element, which is bonded to the position called as a pressure chamber placed in an ink flow passage within a recording head, to make the piezoelectric element bend to shrink the inner volume of the pressure chamber and to thereby eject and spray the inkjet recording ink as droplets from a nozzle hole of the recording head.

An ink recorded matter is obtained on demand on a recording medium by recording an image on the recording medium using the inkjet recording apparatus of the present invention which houses the inkjet recording ink of the present invention. The inkjet recording ink can be replaced on an ink cartridge basis.

Hereinafter, the ink cartridge and the inkjet recording apparatus of the present invention will be described with reference to FIG. 1.

Figure 1:
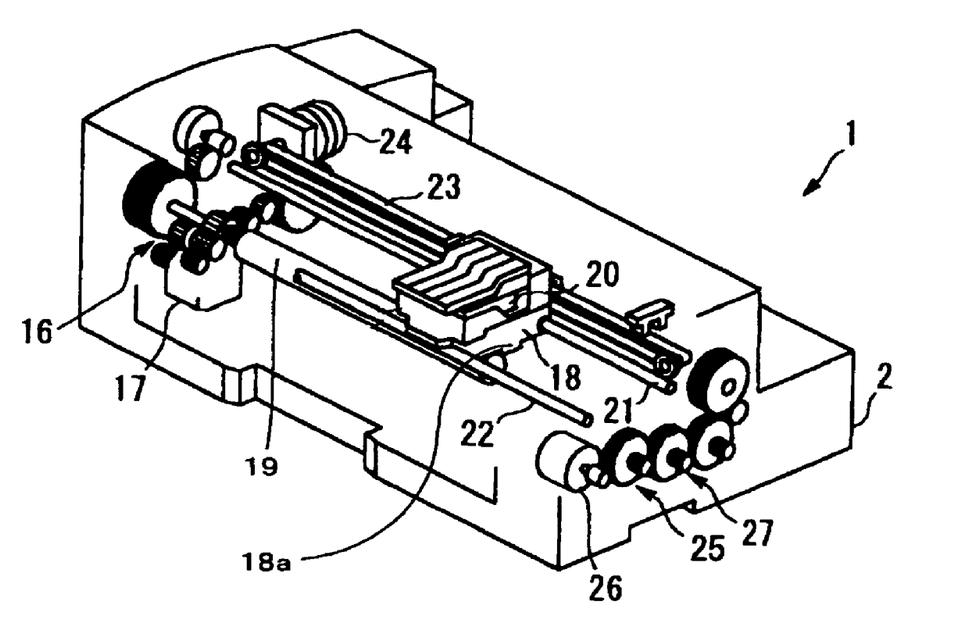
FIG. 1 is a perspective view showing one example of an inkjet recording apparatus of the present invention.

In FIG. 1, an ink cartridge 20 for housing the inkjet recording ink of the present invention is housed in a carriage 18. In FIG. 1, a plurality of the ink cartridges 20 are disposed for the sake of convenience, however, the plurality of the ink cartridges 20 are not necessarily required. In this state, the inkjet ink is supplied from the ink cartridge 20 to an ink droplet-jetting head 18a which is mounted on the carriage 18. The inkjet ink is ejected from an ink-jetting nozzle 18a, although the ink-jetting nozzle surface is not shown in FIG. 1 because it faces downward.

The ink droplet-jetting head 18a mounted on the carriage 18 moves by motion of a timing belt 23 that is driven by a primary scanning motor 24 in a state where the ink droplet-jetting head 18a is guided by guide shafts 21 and 22. Meanwhile, a platen 19 places a specific coat paper (image support) at a position where the specific coat paper faces to the ink droplet-jetting head 18a. In FIG. 1, an inkjet recording apparatus 1 is equipped with a main housing 2, a gear system 16, a sub-scanning motor 17, gear systems 25 and 27, and another primary scanning motor 26.

(Ink Recorded Matter)

An ink recorded matter of the present invention is composed of at least an image formed on a recording medium with the use of the inkjet recording ink according to the present invention.

The recording medium is not particularly limited and can be appropriately selected depending on the purpose; preferred examples thereof include a recording medium having ink absorbency such as paper, and a recording medium substantially lacking ink absorbency.

Examples of the recording medium include plastic sheets based on a material such as polyethylene terephthalate, polycarbonate, polypropylene, polyethylene, polysulfone, ABS resins, or polyvinyl chloride; recording media manufactured by coating with a metal a surface of a metal such as brass, iron, aluminum, SUS, or copper, or by coating with a metal a nonmetal base material, using a technique such as vapor deposition; recording media manufactured by subjecting paper as a base material to water-shedding treatment; and recording media composed of a so-called ceramic material manufactured by firing an inorganic material at a high temperature. Among these, paper is particularly preferred in terms of economic efficiency and naturalness of images produced thereon.

EXAMPLES

Hereinafter, Examples of the present invention will be described; however, the present invention is not at all limited to these Examples.

Preparation Example 1

—Preparation of Pigment Dispersion Liquid 1—

| <Formulation> | |
|---|---|
| Carbon black (gas black; NIPEX 150-IQ, manufactured by Degussa Japan Co., Ltd.) | 200 parts by mass |
| Sodium naphthalene sulfonate formalin condensate (PIONINE A-45-PN, manufactured by Takemoto Oil & Fat Co., Ltd.; total amount of a dimer, a trimer, and a tetramer of naphthalenesulfonic acid in the condensate = 30% by mass) | 50 parts by mass |
| Distilled water | 750 parts by mass |

A mixture containing the components described immediately above was premixed, and then the mixture was dispersed by means of a bead mill dispersing device (UAM-015, manufactured by Kotobuki Industries Co., LTD.) using a zirconia bead having a diameter of 0.03 mm (density: 6.03× $10^{-6}$ g/m$^3$) at a circumferential speed of 10 m/s and a liquid temperature of 30° C. for 15 min. Then, coarse particles were separated from the mixture by means of a centrifugal separator (Model-3600, manufactured by Kubota Corporation) to thereby prepare pigment dispersion liquid 1.

Preparation Example 2

—Preparation of Pigment Dispersion Liquid 2—

Pigment dispersion liquid 2 was prepared in the same manner as in Preparation Example 1, except that COLOR BLACK S170 (channel black; manufactured by Degussa Japan Co., Ltd.) was used in place of the carbon black used in pigment dispersion liquid 1 and that the total amount of the dimer, the trimer, and the tetramer of naphthalenesulfonic acid used in pigment dispersion liquid 1 was changed from 30% by mass to 50% by mass.

Preparation Example 3

—Preparation of Pigment Dispersion Liquid 3—

Pigment dispersion liquid 3 was prepared in the same manner as in Preparation Example 1, except that a carbon black (furnace black; PRINTEX 95, manufactured by Degussa Japan Co., Ltd.) was used in place of the carbon black used in pigment dispersion liquid 1.

Preparation Example 4

—Preparation of Pigment Dispersion Liquid 4—

Pigment dispersion liquid 4 was prepared in the same manner as in Preparation Example 1, except that COLOR BLACK FW200 (channel black; manufactured by Degussa Japan CO., Ltd.) was used in place of the carbon black used in pigment dispersion liquid 1.

Preparation Example 5

—Preparation of Pigment Dispersion Liquid 5—

Pigment dispersion liquid 5 was prepared in the same manner as in Preparation Example 1, except that a carbon black, #44 (furnace black; manufactured by Mitsubishi Chemical Corporation) was used in place of the carbon black used in pigment dispersion liquid 1.

Preparation Example 6

—Preparation of Pigment Dispersion Liquid 6—

Pigment dispersion liquid 6 was prepared in the same manner as in Preparation Example 1, except that a carbon black, PRINTEX 140U (channel black; manufactured by Degussa Japan Co., Ltd.) was used in place of the carbon black used in pigment dispersion liquid 1.

Preparation Example 7

—Preparation of Pigment Dispersion Liquid 7—

Pigment dispersion liquid 7 was prepared in the same manner as in Preparation Example 5, except that the total amount of the dimer, the trimer, and the tetramer of naphthalenesulfonic acid used in pigment dispersion liquid 5 was changed from 30% by mass to 18% by mass.

Preparation Example 8

—Preparation of Pigment Dispersion Liquid 8—

Pigment dispersion liquid 8 was prepared in the same manner as in Preparation Example 6, except that the total amount of the dimer, the trimer, and the tetramer of naphthalenesulfonic acid used in pigment dispersion liquid 6 was changed from 30% by mass to 85% by mass.

Preparation Example 9

—Preparation of Pigment Dispersion Liquid 9—

Pigment dispersion liquid 9 was prepared in the same manner as in Preparation Example 1, except that the total amount of the dimer, the trimer, and the tetramer of naphthalenesulfonic acid used in pigment dispersion liquid 1 was changed from 30% by mass to 15% by mass.

Preparation Example 10

—Preparation of Pigment Dispersion Liquid 10—

Pigment dispersion liquid 10 was prepared in the same manner as in Preparation Example 1, except that the primary particle diameter of the carbon black used in pigment dispersion liquid 1 was changed to 9 nm (FW285, manufactured by Degussa Japan Co., Ltd.).

Preparation Example 11

—Preparation of Pigment Dispersion Liquid 11—

Pigment dispersion liquid 11 was prepared in the same manner as in Preparation Example 1, except that the primary particle diameter of the carbon black used in pigment dispersion liquid 1 was changed to 31 nm (PRINTEX. 150T, manufactured by Degussa Japan Co., Ltd.).

Preparation Example 12

—Preparation of Pigment Dispersion Liquid 12—

Pigment dispersion liquid 12 was prepared in the same manner as in Preparation Example 1, except that the period of time for dispersing the mixture by the bead mill dispersing device in the preparation of pigment dispersion liquid 1 was changed from 15 min to 20 min.

Preparation Example 13

—Preparation of Pigment Dispersion Liquid 13—

Pigment dispersion liquid 13 was prepared in the same manner as in Preparation Example 1, except that the period of time for dispersing the mixture by the bead mill dispersing device in the preparation of pigment dispersion liquid 1 was changed from 15 min to 8 min.

Next, characteristics of the pigment dispersion liquids 1 to 13 thus obtained were measured in a manner described below. The results are shown in Table 1.

<Average Primary Particle Diameter of Carbon Black>

An average primary particle diameter of a carbon black was determined by photographing carbon black particles using an electron microscope and calculating from the diameters and the number of carbon black particles in the photographic images.

<BET Specific Surface Area of Carbon Black>

The BET specific surface area of a carbon black was measured by BET method using nitrogen adsorption.

<Volume Average Particle Diameter and Standard Deviation of Pigment Dispersion Liquid>

The volume average particle diameter ($D_{50}$) and the standard deviation of a pigment dispersion liquid were measured using a particle size distribution measuring device (UPA 150EX, manufactured by NIKKISO CO., LTD.).

<HPLC Analysis of Naphthalene Sulfonate Condensate>

Device: LC-10vp (manufactured by Shimadzu Corporation)

Column: ZORBAX BP-ODS (manufactured by GL Science Inc.; 4.6 id×150 mm)

Guard column: ZORBAX BP-ODS (manufactured by GL. Science Inc.; 4.0 id×10 mm)

Detector: UV (237 nm)

Moving phase: $CH_3CN$/0.005M PIC aqueous solution=25/75 (volume ratio)

Flow rate: 1 mL/min

Preparation of sample: 200 ppm soln

Injection dose: 20 µL,

Examples 1 to 19 and Comparative Examples 1 to 7

—Production of Inkjet Recording Ink—

Inkjet recording inks of Examples 1 to 19 and Comparative Examples 1 to 7 were each prepared by mixing a pigment dispersion liquid A thus obtained and one of the following two types of self-dispersible pigment dispersion liquid B in accordance with the following ink formulation and Table 1, stirring the mixture for 30 min, filtering the mixture through a membrane filter having a pore size of 0.8 μm, and finally subjecting the filtrate to vacuum deaeration.

—Self-Dispersible Pigment Dispersion Liquid B—

B-1 liquid: a liquid prepared by dispersing a carboxyl-group-containing carbon black (CAB-O-JET300, manufactured by Cabot Corporation) in water (concentration of the carbon black: 20% by mass).

B-2 liquid: a liquid prepared by dispersing a sulfo-group-containing carbon black (CAB-O-JET200, manufactured by Cabot Corporation) in water (concentration of the carbon black: 20% by mass).

—Ink Formulation—

Pigment dispersion liquid A . . . at an amount indicated in Table 1

Self-dispersible pigment dispersion liquid B . . . at an amount indicated in Table 1

However, the total amount of the pigment dispersion liquid A and the self-dispersible pigment dispersion liquid B is 80 parts by mass.

| | |
|---|---|
| Glycerin | 7.5 parts by mass |
| Diethylene glycol | 22.5 parts by mass |
| 2-ethyl-1,3-hexanediol | 3.0 parts by mass |
| 2-pyrolidone | 3.0 parts by mass |
| Polyoxyethylene (3) alkyl ($C_{13}$) sodium acetate ether | 0.45 parts by mass |
| Distilled water | 38.55 parts by mass |

<Volume Average Particle Diameter and Standard Deviation of Ink>

The volume average particle diameter ($D_{50}$) and a standard deviation of an ink were measured using a particle size distribution measuring device (UPA 150EX, manufactured by NIKKISO CO., LTD.).

Next, an image was recorded on regular paper (PPC Paper 4024, manufactured by Fuji Xerox Office Supply Co., Ltd.) and gloss paper (RICOH BUSINESS COAT GLOSS paper, manufactured by Ricoh Company, Ltd.) with each of the inkjet recording inks of Examples 1 to 19 and Comparative Examples 1 to 7, using an inkjet printer (MJ-930C, manufactured by SEIKO EPSON Corp.) to evaluate the inkjet recording inks as to their image density, ejection stability, and storage stability of ink as follows. The results are shown in Table 2.

<Image Density>

The image density of each of the inkjet recording inks on regular paper and gloss paper was determined by measuring the solid image obtained using X-RITE densitometer (manufactured by X-Rite Inc.).

<Ejection Stability>

For evaluating the ejection stability, after ink recorded matters were prepared by an inkjet printer using each of the inkjet recording inks, the inkjet printer was left intact with the inkjet head capped, at a temperature of 40° C. for 1 month. Then, whether or not the ink-ejection condition of the inkjet printer could be recovered to the initial ink-ejection condition level was evaluated, based on the number of cleaning operations, according to the following criteria.

[Evaluation Criteria]

A: recovered to the initial level with one cleaning operation

B: recovered to the initial level with two or three cleaning operations

C: could not be recovered to the initial level even with three or more cleaning operations <Storage Stability of Ink>

Each of the inkjet recording inks was placed and sealed in a polyethylene container and stored at 70° C. for three weeks. Then, the particle diameter, the surface tension, and the viscosity of each of the inkjet recording inks were measured. Each of the inkjet recording inks was evaluated by the change rates in the physical properties from the initial levels according to the following evaluation criteria.

[Evaluation Criteria]

A: The highest change rate in all the evaluation items of particle diameter, surface tension and viscosity was less than 5%.

B: The highest change rate in all the evaluation items of particle diameter, surface tension and viscosity was less than 10%.

C: The highest change rate in all the evaluation items of particle diameter, surface tension and viscosity was less than 30%.

D: At least one evaluation item of particle diameter, surface tension and viscosity had a change rate of 30% or more.

TABLE 1

| | Pigment dispersion liquid (liq.) (A) Type | Self-diapersible liq. (B) Type | Dispersion liq. (A)/Self-dispersible liq. (B) (= mass ratio (Ac:Bc)* | Specific surface area of carbon black in dispersion liq (A) (BET · m²/g) | Primary particle diameter of carbon black in dispersion liq. (A) (nm) | Total amount of dimer, trimer, and tetramer in sodium naphthalene sulfonate formalin condensate (% by mass) | Volume average particle diameter ($D_{50}$) of dispersion liq. (A) (nm) | Standard deviation of particle diameter of dispersion liq. (A) |
|---|---|---|---|---|---|---|---|---|
| Ex. 1 | Dispersion liq. 1 | B-1 liq | 90/10 | 110 | 25 | 30 | 120.3 | 48.3 |
| Ex. 2 | Dispersion liq. 2 | B-1 liq. | 90/10 | 200 | 17 | 50 | 122.6 | 60.2 |
| Ex. 3 | Dispersion liq. 1 | B-1 liq. | 70/30 | 110 | 25 | 30 | 120.3 | 48.3 |
| Ex. 4 | Dispersion liq. 2 | B-1 liq | 70/30 | 200 | 17 | 50 | 122.6 | 50.2 |
| Ex. 5 | Dispersion liq. 1 | B-2 liq. | 70/30 | 110 | 25 | 30 | 120.3 | 48.3 |
| Ex. 6 | Dispersion liq. 2 | B-2 liq. | 70/30 | 200 | 17 | 50 | 122.6 | 50.2 |
| Ex. 7 | Dispersion liq. 1 | B-1 liq. | 70/30 | 110 | 25 | 30 | 81.5 | 38.4 |
| Ex. 8 | Dispersion liq. 2 | B-1 liq. | 70/30 | 200 | 17 | 50 | 171.5 | 80.3 |
| Ex. 9 | Dispersion liq. 3 | B-1 liq. | 70/30 | 250 | 15 | 30 | 148.9 | 71.3 |
| Ex. 10 | Dispersion liq. 4 | B-1 liq. | 70/30 | 460 | 13 | 30 | 122.3 | 49.8 |
| Ex. 11 | Dispersion liq. 1 | B-1 liq. | 98/2 | 110 | 25 | 30 | 161.6 | 62.4 |
| Ex. 12 | Dispersion liq. 1 | B-1 liq. | 50/60 | 110 | 25 | 30 | 150.3 | 60.8 |
| Ex. 13 | Dispersion liq. 5 | B-1 liq. | 50/60 | 110 | 24 | 30 | 121.2 | 48.3 |

TABLE 1-continued

| | Pigment dispersion liquid (liq.) (A) Type | Self-diapersible liq. (B) Type | Dispersion liq. (A)/Self-dispersible liq. (B) (= mass ratio (Ac:Bc)* | Specific surface area of carbon black in dispersion liq (A) (BET·m²/g) | Primary particle diameter of carbon black in dispersion liq. (A) (nm) | Total amount of dimer, trimer, and tetramer in sodium naphthalene sulfonate formalin condensate (% by mass) | Volume average particle diameter ($D_{50}$) of dispersion liq. (A) (nm) | Standard deviation of particle diameter of dispersion liq. (A) |
|---|---|---|---|---|---|---|---|---|
| Ex. 14 | Dispersion liq. 6 | B-1 liq. | 50/50 | 90 | 29 | 30 | 141.8 | 66.4 |
| Ex. 15 | Dispersion liq. 7 | B-1 liq. | 50/60 | 110 | 24 | 18 | 137.2 | 62.3 |
| Ex. 16 | Dispersion liq. 8 | B-1 liq. | 50/60 | 90 | 29 | 85 | 140.3 | 61.4 |
| Ex. 17 | Dispersion liq. 9 | B-1 liq. | 90/10 | 110 | 25 | 15 | 121.3 | 49.6 |
| Ex. 18 | Dispersion liq. 10 | B-1 liq. | 90/10 | 350 | 9 | 30 | 112.3 | 48.3 |
| Ex. 19 | Dispersion liq. 11 | B-1 liq. | 90/10 | 110 | 31 | 30 | 148.3 | 68.3 |
| Comp. Ex. 1 | Dispersion liq. 3 | — | — | 250 | 15 | 30 | 151.2 | 85.3 |
| Comp. Ex. 2 | Dispersion liq. 1 | — | — | 110 | 25 | 30 | 121.8 | 49.6 |
| Comp. Ex. 3 | — | B-2 liq. | — | — | — | — | 131.2 | 65.6 |
| Comp. Ex. 4 | — | B-1 liq. | — | — | — | — | 141.3 | 69.2 |
| Comp. Ex. 5 | Dispersion liq. 12 | — | — | 110 | 25 | 30 | 61.4 | 38.2 |
| Comp. Ex. 6 | Dispersion liq. 13 | — | — | 110 | 25 | 30 | 192.3 | 110.5 |
| Comp. Ex. 7 | Dispersion liq. 1 | B-1 liq. | 40/60 | 110 | 25 | 30 | 148.3 | 59.3 |

*Mass ratio (Ac:Bc) represents mass ratio of the amount of a first carbon black (Ac) in the pigment dispersion liquid A to the amount of a second carbon black (Bc) having a functional group on a surface in the self-dispersible pigment dispersion liquid B.

TABLE 2

| | Volume average particle diameter of ink ($D_{50}$; nm) | Standard deviation of average particle diameter of ink | Image density on regular paper | Image density on gloss paper | Ejection stability | Storage stability |
|---|---|---|---|---|---|---|
| Ex. 1 | 121.5 | 48.2 | 1.55 | 1.92 | A | A |
| Ex. 2 | 123.2 | 51.2 | 1.54 | 1.91 | A | A |
| Ex. 3 | 122.3 | 49.3 | 1.62 | 1.99 | A | A |
| Ex. 4 | 121.6 | 50.6 | 1.61 | 1.98 | A | A |
| Ex. 5 | 121.6 | 47.3 | 1.54 | 1.91 | A | A |
| Ex. 6 | 123.6 | 50.4 | 1.53 | 1.90 | A | A |
| Ex. 7 | 82.5 | 38.9 | 1.5 | 1.87 | A | A |
| Ex. 8 | 172.5 | 81.3 | 1.51 | 1.88 | A | A |
| Ex. 9 | 149.9 | 72.3 | 1.45 | 1.82 | A | A |
| Ex. 10 | 121.3 | 48.8 | 1.51 | 1.88 | A | A |
| Ex. 11 | 151.1 | 62.7 | 1.4 | 1.77 | A | A |
| Ex. 12 | 152.3 | 61.8 | 1.54 | 1.91 | A | A |
| Ex. 13 | 120.2 | 49.3 | 1.46 | 1.83 | A | A |
| Ex. 14 | 141.3 | 66.6 | 1.52 | 1.89 | A | A |
| Ex. 15 | 138.2 | 63.3 | 1.47 | 1.84 | A | A |
| Ex. 16 | 140.2 | 61.5 | 1.52 | 1.89 | A | A |
| Ex. 17 | 124.3 | 52.3 | 1.51 | 1.89 | B | C |
| Ex. 18 | 114.6 | 51.2 | 1.41 | 1.90 | B | C |
| Ex. 19 | 150.2 | 62.5 | 1.45 | 1.84 | B | C |
| Comp. Ex. 1 | 150.2 | 86.3 | 1.05 | 1.42 | C | D |
| Comp. Ex. 2 | 120.8 | 48.6 | 1.38 | 1.89 | A | B |
| Comp. Ex. 3 | 131.7 | 66.6 | 1.39 | 1.74 | A | B |
| Comp. Ex. 4 | 142.3 | 69.3 | 1.37 | 1.76 | A | B |
| Comp. Ex. 5 | 60.4 | 39.2 | 1.21 | 1.58 | B | D |
| Comp. Ex. 6 | 192.6 | 111.5 | 1.17 | 1.54 | C | D |
| Comp. Ex. 7 | 151.3 | 60.8 | 1.52 | 1.72 | A | B |

The results shown in Tables 1 and 2 demonstrated that each of inkjet recording inks of Examples 1 to 19 had a higher image density and was more excellent in ejection stability and ink storage stability than any of the inkjet recording inks of Comparative Examples 1 to 7.

Industrial Applicability

An inkjet recording ink according to the present invention to can be used in various recording processes employing inkjet recording methods; preferred examples of the recording processes include recording processes used in inkjet printers, facsimile machines, and copy machines.

The invention claimed is:

1. An inkjet recording ink comprising:
   a pigment dispersion liquid A containing a first carbon black, a dispersant, and water, and
   a self-dispersible pigment dispersion liquid B which comprises a second carbon black having a functional group on a surface,
   wherein a mass ratio (Ac:Bc) of the amount of the first carbon black (Ac) in the pigment dispersion liquid A to the amount of the second carbon black (Bc) in the self-dispersible pigment dispersion liquid B is 98:2 to 50:50.

2. The inkjet recording ink according to claim 1, wherein the dispersant in the pigment dispersion liquid A is a sodium naphthalene sulfonate formalin condensate, and the total amount of a dimer, a trimer and a tetramer of naphthalenesulfonic acid in the sodium naphthalene sulfonate formalin condensate is 20% by mass to 80% by mass.

3. The inkjet recording ink according to claim 1, wherein the first carbon black in the pigment dispersion liquid A is a gas black, and has a BET specific surface area of $100 \text{ m}^2/\text{g}$ to $400 \text{ m}^2/\text{g}$ and an average primary particle diameter of 10 nm to 30 nm.

4. The inkjet recording ink according to claim 1, wherein in the ink the first and second carbon blacks have a volume average particle diameter ($D_{50}$) of 70 nm to 180 nm as measured by a dynamic light scattering method, and a standard deviation of a particle size distribution of the first and second carbon blacks is one-half or less of the volume average particle diameter $D_{50}$.

5. The inkjet recording ink according to claim 1, wherein the amount of the dispersant contained in the pigment dispersion liquid A is 0.1 parts by mass to 2 parts by mass relative to 1 part by mass of the first carbon black.

6. The inkjet recording ink according to claim 1, wherein the total amount of the carbon blacks in the pigment dispersion liquid A and the self-dispersible pigment dispersion liquid B is 5% by mass to 50% by mass.

7. The inkjet recording ink according to claim 1, wherein the amount of the carbon blacks in the ink is 1% by mass to 20% by mass.

8. An ink cartridge comprising:
a container to house an inkjet recording ink, wherein the inkjet recording ink comprises a pigment dispersion liquid A containing a first carbon black, a dispersant, and water, and a self-dispersible pigment dispersion liquid B which comprises a second carbon black having a functional group on a surface, wherein a mass ratio (Ac:Bc) of the amount of the first carbon black (Ac) in the pigment dispersion liquid A to the amount of the second carbon black (Bc) in the self-dispersible pigment dispersion liquid B is 98:2 to 50:50.

9. An inkjet recording apparatus comprising:
an ink jetting unit configured to jet an inkjet recording ink by applying a stimulus to the inkjet recording ink, wherein the inkjet recording ink comprises a pigment dispersion liquid A containing a first carbon black, a dispersant, and water, and a self-dispersible pigment dispersion liquid B which comprises a second carbon black having a functional group on a surface, wherein a mass ratio (Ac:Bc) of the amount of the first carbon black (Ac) in the pigment dispersion liquid A to the amount of the second carbon black (Bc) in the self-dispersible pigment dispersion liquid B is 98:2 to 50:50.

10. The inkjet recording method apparatus according to claim 9, wherein the inkjet recording apparatus uses one of a piezo-inkjet method and a thermal-inkjet method.

* * * * *